United States Patent [19]

Vinokur

[11] 4,183,964
[45] Jan. 15, 1980

[54] PROCESS FOR MANUFACTURING SAUSAGES

[76] Inventor: Isaac Vinokur, Av. Forest 1485, 1427 Buenos Aires, Argentina

[21] Appl. No.: 926,344

[22] Filed: Jul. 20, 1978

[30] Foreign Application Priority Data

Jul. 29, 1977 [AR] Argentina .............................. 268612

[51] Int. Cl.² .................. B65B 7/02; B65B 9/12
[52] U.S. Cl. ..................... 426/412; 53/450; 138/118.1; 426/108; 426/119; 426/129; 426/135; 426/284; 426/413; 426/420
[58] Field of Search ............... 426/108, 119, 129, 135, 426/284, 646, 412, 413, 414, 513, 523, 420; 53/450, 451, 550, 551, 553, 554; 17/33, 34, 49; 138/118.1

[56] References Cited

U.S. PATENT DOCUMENTS

| | | | |
|---|---|---|---|
| 2,741,559 | 4/1956 | Banowitz | 426/413 X |
| 2,993,313 | 7/1961 | Hogan | 53/450 X |
| 3,229,442 | 1/1966 | Gram | 53/450 |
| 3,511,665 | 5/1970 | Simjian | 426/412 X |
| 3,542,570 | 11/1970 | Bush et al. | 426/414 X |
| 3,620,766 | 11/1971 | Wallace | 426/284 |
| 3,647,485 | 3/1972 | Seiferth | 426/412 X |
| 4,015,021 | 3/1977 | Harima et al. | 426/414 X |

*Primary Examiner*—Arthur L. Corbin
*Attorney, Agent, or Firm*—Ladas, Parry, Von Gehr, Goldsmith & Deschamps

[57] ABSTRACT

Sausages are made by stuffing a meat emulsion into a thermosealable tubular casing, effecting preliminary sealing of the casing into "sausage lengths", at least partially cooking the product and then effecting a final sealing at the site of the preliminary seals which seals are wider than the preliminary seals and thereby compress the meat into the unsealed portion of the tube.

3 Claims, 3 Drawing Figures

U.S. Patent
Jan. 15, 1980
4,183,964
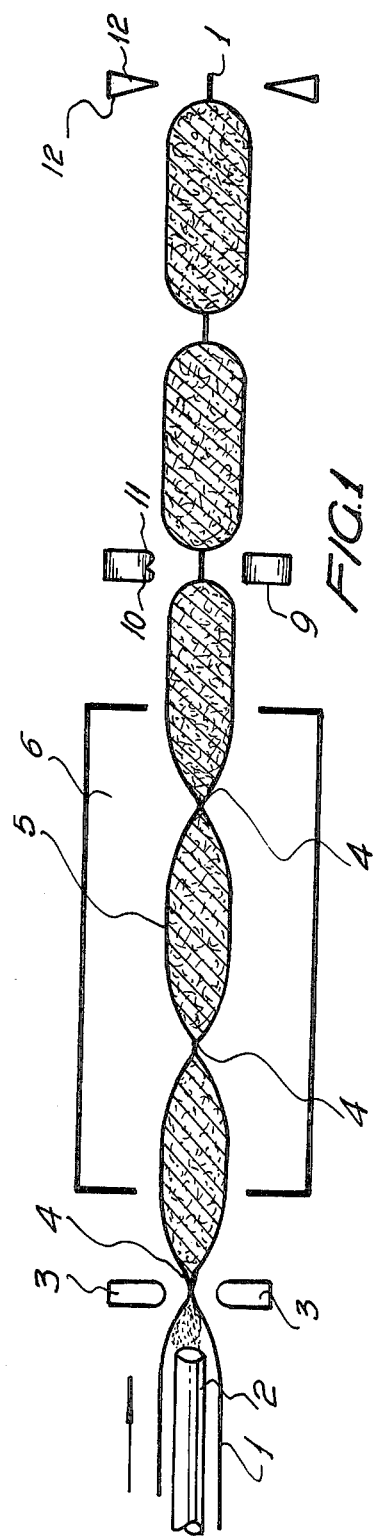
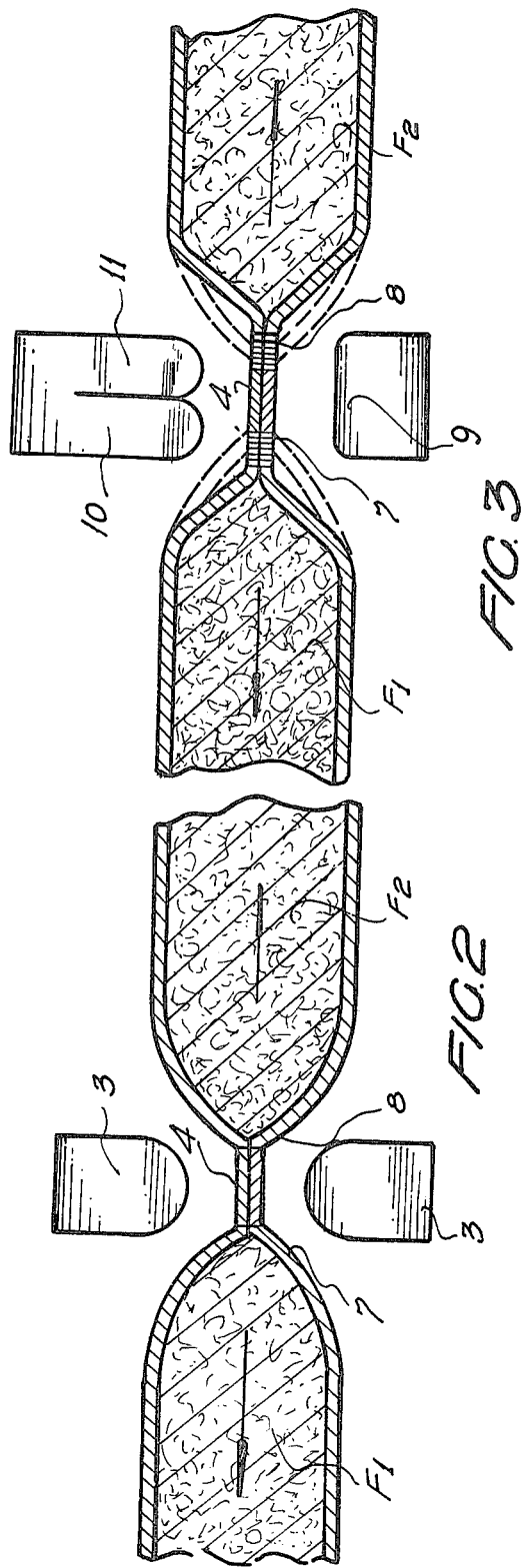

PROCESS FOR MANUFACTURING SAUSAGES

The present invention is an improved process for manufacturing stuffed foods, particularly sausages, and its main object is to provide a particularly novel method by which it is possible to avoid several drawbacks found with the manufacturing processes known heretofore.

As is known, a meat emulsion constituting the material to be employed as stuffing in sausages is obtained by grinding animal meat, including tendons and aponeuroses, with the result that said emulsion contains filamentous portions originating from the action of the knives when they execute the chipping of said tendons and aponeuroses. Said filamentous portions cannot be easily removed, causing a series of drawbacks which will be described below.

In the known processes, the meat emulsion is introduced under pressure into casings made of a thermosealable material, which are thereafter closed at both ends and then are submitted to a cooking action, with the occurrence of inconveniences which can be summarized as follows:

(1) Said filaments are retained in the closure zone, preventing the seal from having its appropriate resistance and tightness.

(2) During the cooking action, as the temperature rises, the volume of the stuffed casing increases, overcoming the resistance of the seal, with the result that the casing opens.

(3) The rise in temperature during the cooking softens the thermosealable material, and the seal loses resistance, so that the rise of the internal pressure provokes the opening of the casing.

The above mentioned drawbacks are avoided by the improved process which constitutes the main object of the invention, without having to remove from the meat emulsion the filamentous portions which are the cause of said drawback, so that when the cooking of the stuffed casings is concluded, they have such an internal pressure that the meat emulsion is caused to fill the total volume of the casing while maintaining the seal in its necessary condition of tightness.

The process of the invention permits the displacement of filaments from the zones that have to be sealed to effect the closure of the thermoplastic casing before carrying out the operations required for said sealing.

To enable the present invention to be well understood and put into practice in a simple manner, it is illustrated by the accompanying drawings, wherein:

FIG. 1 schematically represents the operation sequence constituting the improved process of the present invention;

FIG. 2 is a schematic view of the casing with the emulsion stuffed therein as it remains after a first sealing operation, and FIG. 3 is a view similar to FIG. 2 showing the arrangement of the final seals and the configuration of the casing, with the meat emulsion stuffed therein.

In all the figures, similar references show corresponding parts of the elements handled in the different sequences of the improved procedure of the invention, which is developed as follows:

A tubular casing 1, made of a thermosealable material, is stuffed with a meat emulsion, by means of, for example, a stuffing horn 2, in such a manner that air is not introduced and with minimum pressure, so that a further rise in pressure, caused by the volume increase of the emulsion when it is subjected to a cooking action, does not cause any damage to the final closures which define the finished stuffed article.

After finishing the stuffing operation with the quantity of emulsion required to fill the length of casing which has to correspond to the finished sausage, the tubular casing 1 is sealed, by means of an appropriate apparatus 3, which is not part of the invention, forming a first provisional seal 4, within which even the filamentous portions of the meat emulsion filled into the casing 1 can remain interspersed.

The portions 5 between two successive provisional seals 4 are submitted to a cooking action in an appropriate zone 6, with the proteins being coagulated by this cooking action and with the filaments cohering with the emulsion, those filaments which might have been trapped by the provisional closure remaining in their position, but cooked.

Once the cooking is finished, the casings are cooled and the provisional seal 4 and its adjacent zones 7, 8 are submitted to the action of pressure and temperature on a flat support 9 and pressing said provisional seal and adjacent zones with the clamps 10 and 11 which are, at the same time, heated up to the temperature required for thermosealing said zones 7 and 8, making them wider than the provisional seal.

The pressure exerted by the clamps 10 and 11 on the casing containing the already cooked meat emulsion displaces it in opposite directions, as shown by arrows $f_1$ and $f_2$ in FIG. 2 and deforms the casing, causing a volume decrease in the portions adjacent the provisional sealing 4 and an internal pressure rise in the emulsion up to the final value which the stuffed article is to have, without affecting the final sealings, as the latter are made after the pressure rise. Furthermore, the filaments retained by the provisional seals are cut by the action of the clamps so that they do not affect the new sealings. After these operations are finished, the defined units or links are cut by means of shears 12, for example, between the final sealings, thereby obtaining the formed and compacted sausages. In FIG. 3, the dashed lines show the configuration of the casing with the stuffed meat emulsion, before the final thermosealing of zones 7 and 8 is effected.

As a variation of the above described process, the cooking action of the portions 5 can be carried out in two steps. In the first of these the temperature is raised up to 80° L C. and maintained for about 2 minutes after the provisional seal, which is enough time for coagulation of the proteins. The final closure is thereafter effected and a second cooking, completing the first one in order that the emulsion within the casing takes its final condition, is subsequently effected.

Having the invention been described, together with the manner of carrying it out, it is claimed, as exclusive property and right:

1. In a process for manufacturing sausages which comprises stuffing a meat emulsion into a thermosealable tubular casing, sealing said casing and cooking the product, the improvement which comprises effecting said sealing by making a preliminary thermoseal, prior to at least partially cooking the product, and then effecting a final thermoseal, after at least partially cooking the product, at the site of the preliminary thermoseal but wider than the preliminary seal thereby compressing the at least partly cooked meat into the unsealed portion of the tube.

2. A process according to claim 1 wherein the cooking is effected at such a temperature and for such a period of time that the emulsion is fully cooked.

3. A process according to claim 1 wherein the partial cooking, after the preliminary thermosealing, occurs at a temperature of about 80° C. for about 2 minutes, and after the final thermosealing the cooking is completed.

* * * * *